United States Patent [19]

Heidelberg et al.

[11] Patent Number: 4,931,677

[45] Date of Patent: Jun. 5, 1990

[54] ELECTRO-MAGNETIC LINEAR DRIVE

[76] Inventors: Götz Heidelberg, Am Hügel 16, D-8130 Starnberg-Percha; Andreas Gründl, Haseneystrasse 20, D-8000 München 70; Peter Rosner, Waltherstrasse 16, D-8000 München 2, all of Fed. Rep. of Germany

[21] Appl. No.: 391,637

[22] Filed: Aug. 7, 1989

Related U.S. Application Data

[63] Continuation of Ser. No. 946,651, Dec. 23, 1986, abandoned, which is a continuation of Ser. No. 647,706, Sep. 5, 1984, abandoned.

[30] Foreign Application Priority Data

Sep. 5, 1983 [DE] Fed. Rep. of Germany ....... 3331953

[51] Int. Cl.$^5$ .................. H02K 41/00; B60L 13/02
[52] U.S. Cl. .................................. 310/12; 104/292; 104/294
[58] Field of Search ............... 310/12, 13, 14; 318/37, 318/38, 138; 104/292, 294, 295, 298

[56] References Cited

U.S. PATENT DOCUMENTS

| | | | |
|---|---|---|---|
| 1,754,685 | 4/1930 | Kanter | 310/13 |
| 3,721,874 | 3/1973 | Pelenc et al. | 318/135 |
| 3,874,301 | 4/1975 | Alimanestianu | 104/298 |
| 3,996,858 | 12/1976 | Sangl | 104/292 |
| 4,013,014 | 3/1977 | Holtz | 318/135 X |
| 4,068,152 | 1/1978 | Nakamura et al. | 310/12 |
| 4,460,855 | 7/1984 | Kelly | 310/12 X |

FOREIGN PATENT DOCUMENTS

| | | |
|---|---|---|
| 2635464 | 2/1978 | Fed. Rep. of Germany . |
| 2806601 | 8/1979 | Fed. Rep. of Germany . |
| 141605 | 11/1983 | Japan . |

OTHER PUBLICATIONS

Zer.-Glas. Ann. 105 (1981), Nr. 7/8, Jul./Aug.

Primary Examiner—Peter S. Wong
Assistant Examiner—Judson H. Jones
Attorney, Agent, or Firm—Hubbard, Thurman, Turner, Tucker & Harris

[57] ABSTRACT

An electromagnetic linear drive including a stator which constitutes a path of movement for a vehicle. The linear drive is equipped with current conductors, and is divided into a plurality of stator elements of equal length. A movable portion which constitutes a vehicle is preferably equipped with permanent magnets cooperating with the stator to provide the drive. The stator is divided into a number of motor elements, each motor element including a minimum number of stator elements as well as an energy supply unit adapted to be switched on and off individually by sensors disposed along the path of movement. All motor elements are designed for the same maximum performance, and motor elements of different lengths are provided. The length of each motor element is determined by the local need for maximum performance per unit length which exists at the location of the respective motor element in accordance with a predetermined speed characteristic at that point along the path of movement.

12 Claims, 2 Drawing Sheets

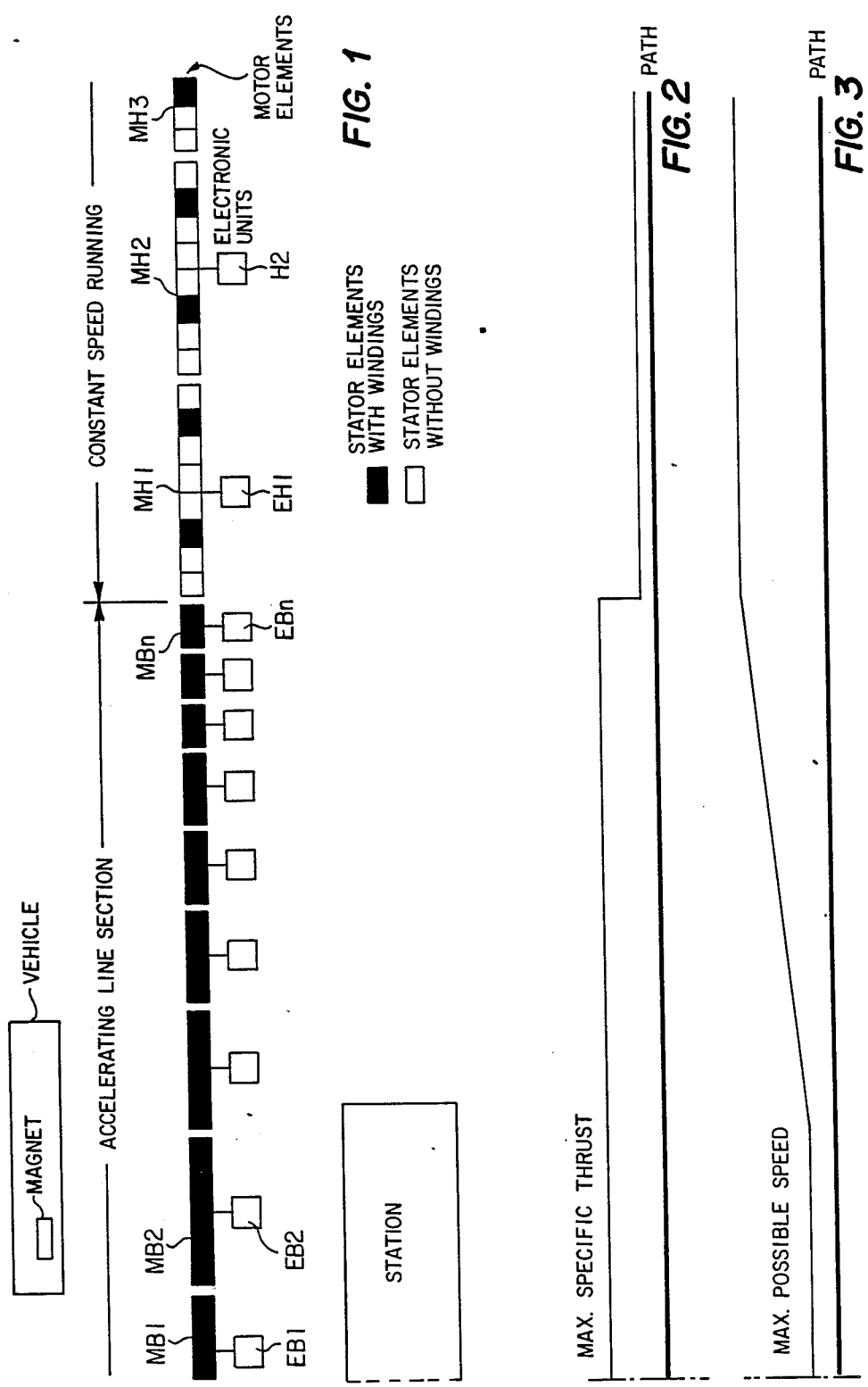

ELECTRO-MAGNETIC LINEAR DRIVE

This application is a continuation of application Ser. No. 946,651, filed 12-23-86, abdn, which application is a continuation of application Ser. No. 647,706 filed 9-5-84, now abdn.

BACKGROUND OF THE INVENTION

The invention relates to an electromagnetic linear drive which includes a stator which constitutes a path of movement for a vehicle. The linear drive is equipped with current conductors, and divided into a plurality of stator elements of equal length. A movable portion which constitutes a vehicle is equipped with magnets, preferably permanent magnets which cooperate with the stationary portion to provide a drive. The stationary portion is divided into a number of motor elements, each including a minimum number of stationary elements and one energy supply unit. The energy supply units are adapted to be switched on and off individually, preferably by sensor means disposed the vehicle.

It is known in the art to divide the stator of an electromagnetic linear drive into several sections. Each section comprises a switching means by which the current conductors of a particular section can be connected to an energy supply unit. In this manner energy need not be supplied simultaneously to all of the current conductors of the stator which constitute the path of movement. If that were necessary, it would involve not only high losses in power but also require components designed for very high performance.

SUMMARY OF THE INVENTION

With the disclosed linear drive of this invention, the individual sections of the stator are switched on and off by sensors which are disposed along the path of movement and can be controlled by the vehicle. Thus the vehicle itself effects the switching on and off of the individual sections of the stationary part of the linear drive.

A selected speed characteristic is required at various points along the path of movement of the electromagnetic linear drive. For instance, after stopping stations accelerating line sections are required and before stopping stations braking line sections are required as well as constant speed line sections at all points in between. This means that the power requirement for the vehicle differs radically along the path of movement.

The costs of the switching units and energy supply units of the individual sections of the stator greatly depend on the maximum performance which will be required of the particular units. As the path of movement is divided into a considerable number of sections, a great number of switching units and energy supply units are needed for a magnetic transit system which will utilize the linear drive of the present invention.

It is, therefore, an object of the invention to achieve a more favorable cost situation with an electromagnetic linear drive of the type cited herein.

With the electromagnetic linear drive disclosed this object is met, in accordance with the invention, in that all motor elements are designed for the same maximum performance, and that motor elements of different lengths are provided, the length of each motor element being determined by the local need for maximum performance per unit length. The local need which exists at each location of a respective motor element is determined in accordance with a predetermined speed characteristic along the path of movement.

The uniform maximum performance required for all motor elements is preferably selected so that the individual circuit components and structural elements may be designed for relatively low nominal output so that less expensive components and structural elements may be employed. The fact that the switching units, energy supply units, and other components, such as stator elements and control units are the same for each motor element presents a further advantage in that these circuit units, energy supply units, etc. may be composed of similar components and structural elements. This is a great advantage with regard to the cost factor because, as is well known, the price per piece of individual components is greatly reduced as the number of pieces increases.

Motor elements of different lengths are used at places having different maximum power requirements. For example, depending on the desired speed characteristic, i.e. on the locally specific acceleration and on the speed along the path of movement, the length of the individual motor elements are varied. Motor elements of decreasing length are disposed one behind the other in accelerating line sections. As the speed increases, therefore, an increasing amount of power will be found per unit length along the path of movement. When a maximum speed has been reached, the power requirement for constant velocity is relatively low. Therefore, the constant speed line sections include motor elements of greater length. This will provide reduced specific maximum power, i.e. power per length along the constant speed line sections. Braking line sections which follow the constant speed line sections will begin with short motor elements which become longer and longer as the distance of the braking line increases.

The preferred embodiment for the constant speed line sections is one in which not all stator elements of a motor element are provided with current conductors. Stator elements without windings, i.e. stator elements not provided with current conductors, are inserted between stator elements furnished with windings i.e. including current conductors. The stator elements without windings have no driving function, instead they merely serve for holding purposes. These sections merely cause the magnetic circuit to be closed in order to carry the vehicle.

Preferably a power control unit is associated with the energy supply unit of each motor element so that the power supplied to the motor element may be reduced to values below the maximum performance of the respective motor element. In this manner, if required, a desired speed may be held which lies below the maximum speed corresponding to a certain predetermined speed characteristic. An especially well suited means to achieve this control is a type of running program control disclosed in the co-pending U.S. application entitled "An Electromagnetic Linear Drive" (U.S. patent application Ser. No. 647,705), filed of even date herewith.

A linear drive comprising constant output motor elements of the type described above is especially advantageous in combination with a particular energy supply unit disclosed in the co-pending patent "Multiphase Electromagnetic Linear Drive" (U.S. patent application Ser. No. 647,707), filed of even date herewith and/or a switchover means for the path of movement in accordance with co-pending U.S. patent application Ser. No. 647,708, entitled "An Electromagnetic Linear Drive", filed of even date herewith, and/or the running program control already mentioned above.

A special advantage of the electromagnetic linear drive of the present invention, which includes motor elements of equal maximum performance and different lengths is to be seen in a safety effect provided. Nowhere along the path of movement can the vehicle surpass a given maximum speed. In a constant speed line section, for instance, the vehicle cannot go beyond a predetermined constant speed. This is an advantage especially in operating a vehicle through curves. There the vehicle cannot reach a speed which is higher than the maximum speed determined by the design of the particular line section.

In an especially preferred embodiment of the present invention the length of the individual motor elements is small as compared to the vehicle length. In this manner only those motor elements actually located below a vehicle or train will operate and contribute to the thrust of the vehicle.

BRIEF DESCRIPTION OF THE DRAWINGS

The invention and further developments of the invention will be described further, by way of a preferred embodiment, with reference to the accompanying drawings, in which:

FIG. 1 is a diagrammatic presentation of a line equipped with motor elements in the area of a stopping station;

FIG. 2 is a graphical presentation of the maximum specific thrust along the line shown in FIG. 1; and FIG. 3 is a graphic representation of the maximum speed of the line shown in FIG. 1.

DETAILED DESCRIPTION OF THE PREFERRED EMBODIMENT

Figure 4:
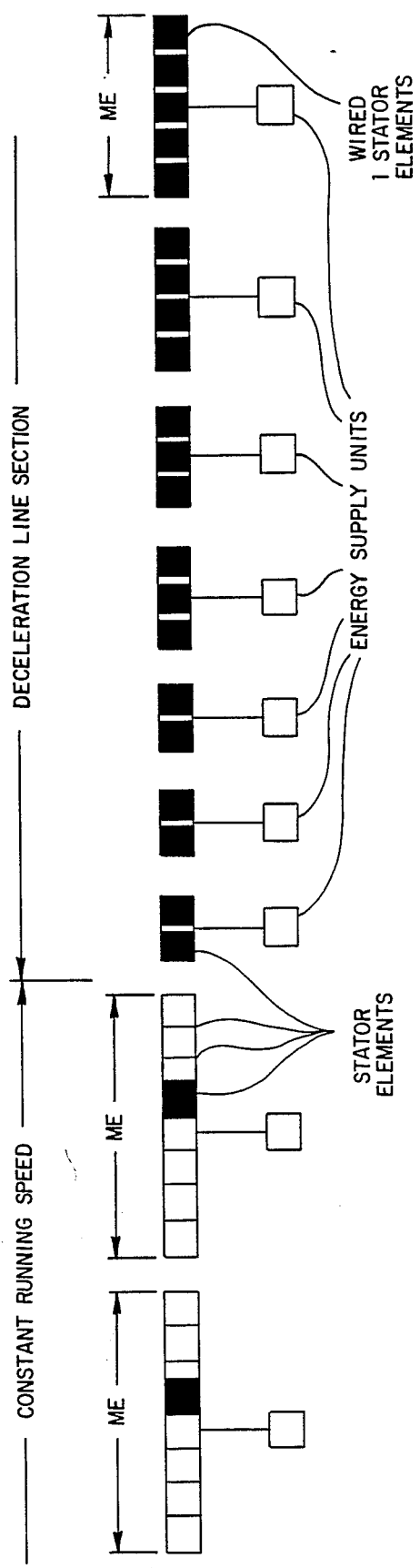

FIG. 1 shows a line section beginning at station S, at which the vehicle 10 stops. To leave the station S, the vehicle first passes through an accelerating line section including a plurality of motor elements MB1, MB2, ... MBn, each of which includes an associated electronics unit EB1, EB2, ... EBn. All of the individual motor elements are short as compared to the length of the vehicle or train, and they are all designed for equal maximum performance. Therefore, each electronics unit is also designed for the same maximum performance.

When leaving station S, the vehicle passes over motor elements which become shorter and shorter. As the distance of the vehicle from station S increases, a selected amount of power is available to the vehicle in each of the line sections which become shorter and shorter. This results in acceleration and consequently results in increasing the speed of the vehicle.

The end of the accelerating line section is coupled to a line section of steady-state or constant speed running where the motor elements MH1, MH2, MH3, ... are designed for the same maximum performance as the motor elements of the accelerating line section. However, as less thrust is required for constant speed running, the motor elements MH1, MH2, MH3, ... of the line section for constant speed running are long and electromagnetically "thinned out". This is achieved by providing windings only on some of the stator elements and leaving the remaining stator elements without windings. The stator elements provided with windings are inserted periodically between the stator elements without windings in order to achieve uniform constant speed running.

As depicted in FIG. 1, stator elements with windings are shaded in black and stator elements without windings are unshaded.

If it is assumed that maximum power is fed to all motor elements shown in FIG. 1, the thrust and acceleration characteristic shown in FIG. 2 results along the line section shown in FIG. 1. A maximum specific thrust acts upon the vehicle up to the end of the accelerating line section. Beginning with the subsequent constant speed line section a reduced thrust acts on the vehicle to keep it in steady-state movement and to compensate for speed losses common to any vehicle which is in steady-state movement.

FIG. 3 shows the maximum possible speed achieved. When leaving station S the maximum possible speed rises continuously because of the constant acceleration until such time as it passes over into a constant speed as the vehicle enters the constant speed line section. The thrust applied during steady-state movement merely serves to balance output losses.

The energy supplied to the individual motor elements preferably can be reduced to values which lie below the maximum performance. Thus the running behavior of the vehicle can be influenced if it is desired that the respective local maximum speed should not be attained. At no place along the path of movement, however, can the vehicle surpass the maximum possible speed for a particular place. The selection of the length of the motor element at any selected location thus guarantees a speed limit from the very beginning, and this contributes to the safety of the system.

It may be summarized as follows:

The basic units of the electromagnetic linear drive according to the present invention are the motor elements. These elements are composed of a plurality of stator elements of a certain uniform length, for instance 72 centimeters. The maximum performance is the same for each motor element. An adaptation of this maximum performance to the actual requirement is obtained by use of multiple components of this maximum performance. The only factor that is varied is the number of individual components per length of the path of movement. Typical lengths of motor elements are from about 1.4 meters to about 6 meters. The exact length of the individual motor elements are a result of the local power requirement. Much thrust but little power at low speeds is needed on starting and braking. An adaptation of power is achieved here by connecting a corresponding number of stator elements in series and feeding them by one energy supply unit. The resulting motor elements are of corresponding lengths. Motor elements of the shortest length are found in the line section of great acceleration and high speed. During constant speed running the power requirement is low. Here the motor elements are made longer by inserting stator elements without windings whereby the construction expenditure per length of path of movement is reduced accordingly.

Although a single embodiment of this invention has been described, it will be apparent to a person skilled in the art that various modifications to details of construction shown and described may be made without departing from the scope of this invention.

What is claimed is:

1. An electromagnetic linear drive system, comprising:

a series of equal-length, electrically activable stator sections arranged consecutively along a linear path;

a series of motor elements arranged consecutively along said path, each motor element including a predetermined number of said equal-length, electrically activable stator sections;

a vehicle adapted for movement along said path, said vehicle having a magnetic portion thereon cooperative with said motor elements for electromagnetically moving said vehicle along said path;

a series of substantially equal performance power supply units, each connected to a different one of said motor elements for supplying a substantially equal amount of electrical power to each motor element and concurrently activating said predetermined number of electrically activable stator sections included in that motor element, said predetermined number of electrically activable stator sections being inversely related to a selected electromagnetic force required along the length of that motor element to create a desired incremental velocity change in the vehicle as it passes from one end of that motor element to the other end thereof;

sensor means disposed along said path and influenced by the movement of said vehicle along said path, said sensor means being connected to said motor elements for individually activating and deactivating the power supply unit supplying electrical power to each motor element to selectively supply said electromagnetic force along the length of that motor element, said electromagnetic force interacting with said magnetic portion to create said incremental velocity change; and, the stator sections in at least some of said series of motor elements being spaced apart by at least one non-electrically activable spacing section functioning to close the magnetic circuitry of such motor elements and diminish the total per-length electromagnetic force of such motor elements.

2. The electromagnetic linear drive system of claim 1, wherein some of said consecutive motor elements define an acceleration section of said linear path.

3. The electromagnetic linear drive system of claim 1, wherein some of said consecutive motor elements define a constant velocity section of said linear path.

4. The electromagnetic linear drive system of claim 1, wherein some of said consecutive motor elements define a deceleration section of said linear path.

5. The electromagnetic linear drive system of claim 2, wherein successive ones of said consecutive motor elements defining said acceleration section have predetermined, sequentially decreasing numbers of electrically activable stator sections, each predetermined numbers of electrically activable stator sections providing a constant propulsive force along the length of its motor element that sequentially increase at each consecutive motor element defining said acceleration section to create a positive incremental velocity change in the vehicle as it passes from one end of each motor element defining said acceleration section to the other end thereof.

6. The electromagnetic linear drive system of claim 4, wherein successive ones of said consecutive motor elements defining said deceleration section have predetermined, sequentially increasing numbers of electrically activable stator sections, each predetermined number of electrically activable stator sections providing a constant repulsive force along the length of its motor element that sequentially decreases at each consecutive motor element defining said acceleration section to create a negative incremental velocity change in the vehicle as it passes from one end of each motor element defining said acceleration section to the other end thereof.

7. The electromagnetic linear drive system of claim 3, wherein said stator sections being spaced apart by at least one non-electrically activable spacing section define said constant velocity section.

8. The electromagnetic linear drive system of claim 3, wherein the incremental velocity change in said constant velocity section is zero.

9. An electromagnetic linear drive system, comprising:

a series of equal-length, electrically activable stator sections arranged consecutively along a linear path;

a series of motor elements arranged consecutively along said path, each motor element including a predetermined number of said equal-length, electrically activable stator sections, some of said consecutive motor elements defining an acceleration section of said linear path, some of said consecutive motor elements defining a constant velocity section of said linear path, and some of said consecutive motor elements defining a deceleration section of said linear path;

a vehicle adapted for movement along said path, said vehicle having a magnetic portion thereon cooperative with said motor elements for electromagnetically moving said vehicle along said path;

a series of substantially equal performance power supply units, each connected to a different one of said motor elements for supplying a substantially equal amount of electrical power to each motor element and concurrently activating said predetermined number of electrically activable stator sections included in that motor element, said predetermined number of electrically activable stator sections being inversely related to a selected electromagnetic force required along the length of that motor element to create a desired incremental velocity change in the vehicle as it passes from one end of that motor element to the other end thereof, said incremental velocity change being positive in said acceleration section, said incremental velocity change being negative in said deceleration section, and said incremental velocity change being zero in said constant velocity section;

sensor means disposed along said path and influenced by the movement of said vehicle along said path, said sensor means being connected to said motor elements for individually activating and deactivating the power supply unit supplying electrical power to each motor element to selectively supply said electromagnetic force along the length of that motor element, said electromagnetic force interacting with said magnetic portion to create said incremental velocity change; and, the stator sections in at least some of said series of motor elements defining said constant velocity section being spaced apart by at least one non-electrically activable spacing section functioning to close the magnetic circuitry of such motor elements and diminish the total per-length electromagnetic force of such motor element thereof.

10. The electromagnetic linear drive system of claim 9, wherein successive ones of said consecutive motor elements defining said acceleration section have predetermined, sequentially decreasing numbers of electrically activable stator sections, each predetermined numbers of elecftrically activable stator sections providing a constant propulsive force along the length of its motor element that sequentially increases at each consecutive motor element defining said acceleration section to create a positive incremental velocity change in the vehicle as it passes from one end of each motor element defining said acceleration section to the other end thereof.

11. The electromagnetic linear drive system of claim 9, wherein successive ones of said consecutive motor elements defining said deceleration section have predetermined, sequentially increasing numbers of electrically activable stator sections, each predetermined numbers of electrically activable stator sections providing a constant repulsive force along the length of its motor element that sequentially decreases at each consecutive motor element defining said acceleration section to create a negative incremental velocity change in the vehicle as it passes from one end of each motor element defining said acceleration section to the other end thereof.

12. An electromagnetic linear drive system, comprising:
   a series of equal length, electrically activable stator sections arranged consecutively along a linear path;
   a series of motor elements arranged consecutively along said path, each motor element including a predetermined number of said equal-length, electrically activable stator sections, some of said consecutive motor elements defining an acceleration section of said linear path, some of said consecutive motor elements defining a constant velocity section of said linear path, and some of said consecutive motor elements defining a deceleration section of said linear path;
   a vehicle adapted for movement along said path, said vehicle having a magnetic portion thereon cooperative with said motor elements for electromagnetically moving said vehicle along said path;
   a series of substantially equal performance power supply units, each connected to a different one of said motor elements for supplying a substantially equal amount of electrical power to each motor element and concurrently activating said predetermined number of electrically activable stator sections included in that motor element, said predetermined number of electrically activable stator sections being inversely related to a selected electromagnetic force required along the length of that motor element to create a desired incremental velocity change in the vehicle as it passes from one end of that motor element to the other end thereof, said incremental velocity change being positive in said acceleration section, said incremental velocity change being negative in said deceleration section, and said incremental velocity change being zero in said constant velocity section,
   successive ones of said consecutive motor elements defining said acceleration section having predetermined, sequentially decreasing numbers of electrically activable stator sections, each predetermined numbers of electrically activable stator sections providing a constant propulsive force along the length of its motor element that sequentially increases at each consecutive motor element defining said acceleration section to create a positive incremental velocity change in the vehicle as it passes from one end of each motor element defining said acceleration section to the other end thereof,
   successive ones of said consecutive motor elements defining said deceleration section having predetermined, sequentially increasing numbers of electrically activable stator sections, each predetermined numbers of electrically activable stator sections providing a constant repulsive force along the length of its motor element that sequentially decreases at each consecutive motor element defining said acceleration section to create a negative incremental velocity change in the vehicle as it passes from one end of each motor element defining said acceleration section to the other end thereof, and,
   each of said stator sections in at least some of said series of motor elements defining said constant velocity section being spaced apart by at least one non-electrically activable spacing section functioning to close the magnetic circuitry of such motor elements and diminish the total per-length electromagnetic force of such motor element thereof for causing a zero incremental velocity over the length of such motor elements; and
   sensor means disposed along said path and influenced by the movement of said vehicle along said path, said sensor means being connected to said motor elements for individually activating and deactivating the power supply unit supplying electrical power to each motor element to selectively supply said electromagnetic force along the length of that motor element, said electromagnetic force interacting with said magnetic portion to create said incremental velocity change.

* * * * *

UNITED STATES PATENT AND TRADEMARK OFFICE
CERTIFICATE OF CORRECTION

PATENT NO. : 4,931,677
DATED : June 5, 1990
INVENTOR(S) : Gotz Heidelberg, et al.

It is certified that error appears in the above-identified patent and that said Letters Patent is hereby corrected as shown below:

Col. 1, line 22, after "disposed" insert --along the path of movement and adapted to be controlled by--

Col. 1, line 63, "motor" should be --stator--

Col. 3, line 33, after "FIG. 1." insert --Figure 4 is a diagrammatic presentation of a line equipped with stator element forming motor elements in constant running and deceleration areas.--

Col. 4, line 2, after "running." insert as a new paragraph -- When approaching a station (Fig. 4), or other deceleration station the vehicle passes a braking section having motor elements disposed in the direction of movement one behind the other with increasing numbers of wired stator elements. Thus, a selected amount of power is available to the vehicle in the braking section for decreasing the speed of the vehicle to a selected value for slow down to stopping at the station.--

Col. 4, line 3, "FIG. 1" should be --Figures 1 and 4--

UNITED STATES PATENT AND TRADEMARK OFFICE
CERTIFICATE OF CORRECTION

PATENT NO. : 4,931,677

DATED : June 5, 1990

INVENTOR(S) : Gotz Heidelberg, et al.

It is certified that error appears in the above-identified patent and that said Letters Patent is hereby corrected as shown below:

Col. 5, line 57, "increase" should be --increases--

Col. 7, line 6, "elecftrically" should be --electrically--

Signed and Sealed this

Fifteenth Day of October, 1991

Attest:

HARRY F. MANBECK, JR.

*Attesting Officer*  *Commissioner of Patents and Trademarks*